United States Patent [19]

Blenner

[11] 4,394,205
[45] Jul. 19, 1983

[54] METHOD FOR VULCANIZATION BONDING OF FLUORINE-CONTAINING ELASTOMERS TO VULCANIZED NATURAL AND SYNTHETIC ELASTOMERS

[75] Inventor: Donald R. Blenner, Erie, Pa.

[73] Assignee: Lord Corporation, Erie, Pa.

[21] Appl. No.: 358,162

[22] Filed: Mar. 15, 1982

[51] Int. Cl.³ .................................................. C09J 5/02
[52] U.S. Cl. ................................ 156/307.3; 156/309.3;
156/319; 156/327; 264/83; 427/255.4; 427/302;
427/322; 427/393.5; 427/400; 427/412.1;
428/420; 428/421; 525/354
[58] Field of Search ..................... 427/302, 400, 393.5,
427/412.1, 255.4, 322; 428/420, 421; 264/83;
156/319, 307.3, 327, 309.3; 525/354

[56] References Cited

U.S. PATENT DOCUMENTS

| | | | |
|---|---|---|---|
| 2,015,165 | 9/1935 | Twiss et al. | 427/302 |
| 2,132,268 | 10/1938 | Mallars | 427/400 |
| 3,418,201 | 12/1968 | Bowman | 428/421 |
| 3,966,530 | 6/1976 | Cutts et al. | 427/302 |

FOREIGN PATENT DOCUMENTS 51-42788  4/1976  Japan ................................ 156/307.3

Primary Examiner—John J. Gallagher
Attorney, Agent, or Firm—John A. Gazewood

[57] ABSTRACT

A method for bonding unvulcanized fluorinated elastomers to vulcanized non-fluorinated elastomers comprising exposing the vulcanized elastomer to a fluorinating agent; applying a conventional fluorinate elastomer adhesive to the treated vulcanized elastomer; contacting the adhesive-coated portion of the vulcanized elastomer with the unvulcanized fluorinated elastomer; and curing in situ the fluorinated elastomer. Sulfur tetrafluoride is a preferred fluorinating agent.

3 Claims, No Drawings

METHOD FOR VULCANIZATION BONDING OF FLUORINE-CONTAINING ELASTOMERS TO VULCANIZED NATURAL AND SYNTHETIC ELASTOMERS

FIELD OF THE INVENTION

This invention relates to the bonding of uncured elastomeric compositions to previously cured elastomeric materials. More particularly, the invention relates to bonding unvulcanized, that is, uncured, fluorocarbon and fluorosilicon elastomers to previously cured natural and synthetic elastomers.

Fluorinated elastomers are a well-known class of synthetic elastomeric materials, which are especially suitable for use in demanding service applications where resistance to combinations of elevated temperatures with fuels, chemicals or other aggressive fluids is necessary. Illustrative applications include O-rings, custom-molded goods, diaphragms, oil seals, tubing, hose, oil well components, pump linings and seals, valve liners, gaskets and packings, and fabric coatings. Fluorinated elastomers have also been utilized as a veneer coating in combination with non-fluorinated elastomers in order to obtain composite articles combining the ability of the non-fluorinated elastomer to withstand operating conditions with the ability of the fluorinated elastomer to withstand elevated temperatures and/or exposure to aggressive fluids. While such veneer-type composites can be formed from unvulcanized fluorinated and non-fluorinated elastomers, it is often more advantageous to form the composite article by a veneering uncured fluorinated elastomer stock to cured, that is, vulcanized, non-fluorinated elastomer stock. In such cases, it is necessary to adhesively bond the dissimilar elastomers. However, the substantially inert surface of the cured elastomer significantly increases the difficulty of obtaining high strength bonds.

The present invention provides a method of bonding uncured fluorine-containing elastomer formulations to a cured, that is, vulcanized natural or synthetic elastomer substrate comprising the steps of:

exposing a surface of said vulcanized natural or synthetic elastomeric substrate to a fluorine-containing compound selected from the group consisting of sulfur tetrafluoride, boron trifluoride and phosphorus pentafluoride;

coating the substrate surface which has been exposed to said fluorine-containing compound with a fluorinated elastomer adhesive;

applying to said adhesive-coated substrate an unvulcanized fluorine-containing elastomer formulation; and curing said unvulcanized elastomer formulation.

The fluorinated elastomers which can be bonded in accordance with this invention can be described broadly as fluorocarbon and fluoro-silicone elastomers. Illustrative of such fluorinated elastomers are vinylidene fluoride-hexafluoropropylene copolymer elastomers (Fluorel®, a trademark of 3M Company, and Viton®, a trademark of E.I. DuPont deNemours and Co., Inc.); chlorotrifluoroethylene-vinylidene fluoride copolymer elastomer (Kel-F®, a trademark of 3M Company); and poly(1,1-dehydroperfluorobutyl)acrylate. Fluorinated silicone rubbers having the general formula

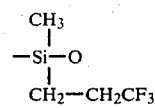

are also suitable for use in the practice of the invention. Currently, the fluorinated silicone elastomers and the vinylidene fluoride-hexafluoropropylene copolymer fluorocarbon elastomers are preferred. The fluorinated elastomers are well known, see "The Vanderbilt Rubber Handbook", R. T. Vanderbilt Co., Inc., Norwalk, CT 1978, and need not be further discussed in detail.

As the vulcanized elastomeric component, there can be employed substantially any known natural rubber or synthetic rubber stock, and including, without limitation, styrene-butadiene rubber (SBR) of both high and low durometer grades and oil-extended types; neoprene (G and W) types; ethylene-propylene copolymer and terpolymer rubbers; butyl rubber; acrylonitrile-butadiene rubber and chlorosulfonated polyethylene rubber.

With respect to both the unvulcanized fluorinated elastomer and the vulcanized elastomer, the described elastomer is fully kneaded with conventional compounding ingredients, such as reinforcing and nonreinforcing fillers, softeners, vulcanization agents, vulcanization accelerators and activators, antioxidants and antiozonants, and the like.

In forming the adhesive bond between the uncured fluorinated elastomer and the vulcanized elastomer component, there can be employed substantially any of the known adhesive compositions which are employed in commercially bonding fluorinated elastomer compositions. Such adhesives are well known and need not be discussed here in detail. Typical of such adhesives are the Chemlok® 217 and Chemlok® 607 adhesives, available from Lord Corporation, Chemical Products Group, Erie, PA.

In preparing laminated rubber articles in accordance with the present invention, the vulcanized substrate is preferably buffed and all buffed material is removed from the substrate. The clean substrate is then preferably washed with a hot aqueous detergent solution, such as commercial Tide detergent, although in some cases, such as where the cured elastomer contains a nitrile component, e.g., butadiene-acrylonitrile copolymer, it may be advantageous to wash the cured elastomer surface with a boiling aqueous potassium hydroxide solution. Following this wash, the cured elastomer surface is rinsed with clean water and dried. The dry elastomer is then placed in a suitable reaction vessel, such as one made from stainless steel, and the reaction vessel is charged with at least one of the fluorinating agents in either a gaseous state or in solution, with the gaseous state being preferred. Sulfur tetrafluoride is currently the preferred fluorinating agent. The dry elastomer is exposed to the fluorinating agent for a time period in the range from 5 minutes to 24 hours, preferably 10 minutes to 12 hours, at a temperature in the range from −30° C. to below the degradation temperature of the elastomer, preferably 20° to 155° C.

Following the fluorination treatment, an adhesive which is conventionally employed for bonding fluorinated elastomers is applied to the bond area by any conventional means, such as by spraying, dipping, painting, and the like, and allowed to dry. The adhesive-coated bond area of the vulcanized elastomer is then contacted with the vulcanizable fluorinated elastomer stock in a conventional manner, as by extrusion molding, injection molding, calendering, or the like. The resulting assembly is then exposed to appropriate conditions of temperature and pressure for a time sufficient to effect curing of the vulcanizable fluorinated elastomer.

The following example is illustrative of the invention.

EXAMPLE

An acrylonitrile-1,3-butadiene compound having the following composition by weight is mixed on a two-roll rubber mill:

| Ingredient | Parts by Weight |
|---|---|
| Medium-high acrylonitrile-1,3-butadiene rubber, ML 45-60 | 100.0 |
| Zinc oxide | 5.0 |
| Sulfur | 0.5 |
| Poly(1,2-dihydro-2,2,4-trimethylquinoline) | 2.0 |
| Stearic acid | 1.0 |
| SRF carbon black | 50.0 |
| Methyl acetyl resinoleate | 5.0 |
| Dioctyl phthalate | 10.0 |
| Tetramethyl thiuram disulfide | 2.0 |
| N—cyclohexyl-2-benzothiazole sulfenamide | 1.0 |

The thus-prepared nitrile rubber formulation is formed into ¼"×6"×12" slabs by compression molding at 100 psi for 10 minutes at 170° C. Individual slabs of the cured nitrile rubber stock are treated as follows:

A. The slab is washed in a hot Tide detergent solution and then boiled for 10 minutes in a hot 30 percent potassium hydroxide solution, then boiled for 5 minutes in a concentrated hydrochloric acid solution, then rinsed in clear deionized water and allowed to air dry. The dry slab is placed in a stainless steel reaction vessel. The vessel is evacuated to 0.1 mm Hg and the slab is dried in the vacuum for 30 minutes. The evacuated vessel is heated to 130° C. and charged with vaporized sulfur tetrachloride to a pressure of 12 psig. The vessel is maintained at 130° C. for 17 hours. The vessel is evacuated to 0.1 mm Hg for 30 minutes and allowed to cool. The fluorine-treated slab is removed from the vessel, rinsed with 1 N sodium hydroxide solution, rinsed with deionized water and allowed to air dry. The thus-treated dry slab is wiped with methyl ethyl ketone solvent and to one-half of one 6"×12" side of the slab is applied a coating of Lord Corporation Chemical Products Group Chemlok 607 Adhesive and the adhesive is allowed to air dry for 16 hours.

B. The slab is wiped with methyl ethyl ketone solvent and to one-half of one 6"×12" side of the slab is applied a coating of Lord Corporation Chemical Products Group Chemlok 607 Adhesive and the adhesive is allowed to air dry for 16 hours.

A fluorinated elastomeric formulation having the following composition by weight is mixed on a two-roll rubber mill:

| Ingredient | Parts by Weight |
|---|---|
| Vinylidene fluoride-hexafluoropropylene rubber | 100.0 |
| Medium-thermal carbon black | 15.0 |
| Magnesia | 20.0 |
| Hexamethylene diamine carbamate | 1.0 |

The fluorinate elastomeric formulation is compression molded to the entire face (6"×12") of the adhesive-coated side of each slab to cover both the adhesive-coated area and the nonadhesive-coated area, and cured at 300 psi for 30 minutes at 153° C. The slabs are removed from the mold and aged in a constant temperature humidity (22° C. at 50 percent R.H.) room for 24 hours. The slabs are cut into 1"×6" strips and tested for adhesion according to the procedure of ASTM D-413. The results are reported in the following Table:

TABLE I

Adhesion of Fluorinated Elastomer to Cured Nitrile Elastomer

| Surface Treatment of Elastomer | Adhesive Coating | Adhesion, Lbs/Linear Inch |
|---|---|---|
| B | No | 0 |
| B | Yes | 3 |
| A | No | 0 |
| A | Yes | 19 |

The data are self-explanatory.

What is claimed is:

1. A method for bonding an unvulcanized fluorinated elastomer to a previously vulcanized non-fluorinated elastomer, wherein saud unvulcanized elastomer is cured in situ against said vulcanized elastomer, said method comprising:
    exposing at least one surface of said vulcanized elastomer to a fluorine-containing compound selected from the group consisting of sulfur tetrafluoride, boron trifluoride and phosphorus pentafluoride;
    coating at least a portion of said at least one surface which has been exposed to said fluorine-containing compound with (a fluorinated elastomeric) an adhesive for fluorinated elastomers;
    applying to the adhesive-coated portion of said at least one surface an unvulcanized fluorinated elastomer composition; and
    curing said unvulcanized fluorinated elastomer composition.

2. A method according to claim 1 wherein said fluorine-containing compound comprises sulfur tetrafluoride.

3. A method according to claim 2 wherein said fluorinated elastomer comprises vinylidene fluoride-hexafluoropropylene copolymer elastomer.

* * * * *